United States Patent
Sawayanagi et al.

(10) Patent No.: US 8,508,571 B2
(45) Date of Patent: Aug. 13, 2013

(54) TELECONFERENCE SYSTEM

(75) Inventors: Kazumi Sawayanagi, Itami (JP); Hideyuki Matsuda, Hirakata (JP); Toshihiko Otake, Ikeda (JP); Kazusei Takahashi, Nishinomiya (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 199 days.

(21) Appl. No.: 13/178,000

(22) Filed: Jul. 7, 2011

(65) Prior Publication Data

US 2012/0013704 A1 Jan. 19, 2012

(30) Foreign Application Priority Data

Jul. 15, 2010 (JP) ................................. 2010-160415

(51) Int. Cl.
*H04N 7/15* (2006.01)

(52) U.S. Cl.
USPC ................... 348/14.03; 348/14.08; 348/14.12

(58) Field of Classification Search
USPC ................... 348/14.01–14.16; 715/753, 863; 370/260–261; 709/204–205
See application file for complete search history.

(56) References Cited

U.S. PATENT DOCUMENTS

| | | |
|---|---|---|
| 2004/0027397 A1 | 2/2004 | Sato |
| 2008/0163130 A1* | 7/2008 | Westerman ................... 715/863 |
| 2008/0184124 A1* | 7/2008 | Agarwal et al. ............... 715/733 |
| 2009/0079813 A1* | 3/2009 | Hildreth ...................... 348/14.03 |
| 2011/0154266 A1* | 6/2011 | Friend et al. .................. 715/863 |

FOREIGN PATENT DOCUMENTS

| | | |
|---|---|---|
| GB | 2 351 216 A | 12/2000 |
| GB | 2 351 425 A | 12/2000 |
| GB | 2 351 635 A | 1/2001 |
| GB | 2 351 636 A | 1/2001 |
| JP | 2000-242427 A | 9/2000 |
| JP | 2000-244886 A | 9/2000 |
| JP | 2005-228353 A | 8/2005 |
| JP | 2006-164177 A | 6/2006 |
| JP | 2008-254103 A | 10/2008 |

* cited by examiner

*Primary Examiner* — Melur Ramakrishnaiah
(74) *Attorney, Agent, or Firm* — Buchanan Ingersoll & Rooney PC

(57) ABSTRACT

A teleconference system for connecting a plurality of conference bases via a network, each of the conference bases having: a display device for displaying an image on a screen; a video camera that is capable of measuring a depth; a person identifying section for identifying a participant who has made a specified gesture as a speaker, from a video picture taken by the video camera; an image input/display control section that usually keeps the display device displaying predetermined conference material on the screen and that turns the screen blank triggered by the person identifying section's identifying a speaker; a motion identifying section for identifying and digitalizing a motion of the speaker's hand to make motion data; and an image generating section for making a line drawing in accordance with the motion data made by the motion identifying section; wherein the image input/display control section controls the display device to display the line drawing made by the image generating section on the screen.

12 Claims, 7 Drawing Sheets

TELECONFERENCE SYSTEM

This application is based on Japanese Patent Application No. 2010-160415 filed on Jul. 15, 2010, the content of which is incorporated herein by reference.

BACKGROUND OF THE INVENTION

1. Filed of the Invention

The present invention relates to a teleconference system for permitting persons present in a plurality of bases to participate in a conference by connecting the bases via a network.

2. Description of Related Art

In recent years, a teleconference system wherein a plurality of conference bases are connected via a network has been turned into actual utilization. In the teleconference system, display devices are placed in the conference bases, and not only audio signals but also video signals are exchanged among the conference bases so that persons in one base can see how things are going in other bases. In this system, it is possible to share information among persons in all the conference bases by using an application or an interactive board to display text data and graphic data on the display devices in the bases along with the progress of the conference.

Japanese Patent Laid-Open Publication No. 2000-242427 discloses a teleconference assisting system that permits a presenter to draw on a screen with a light emission pointer. In this system, when a presenter draws on the screen with the light emission pointer, the position of the light emitted from the light emission pointer on the screen is detected, and the motion of the light is recorded. Then, light is projected on the same position as detected to trace the motion of the light emitted from the light emission point on the screen.

Japanese Patent Laid-Open Publication No. 2000-244886 discloses that each user wears a pair of colored body markers and a headset and that the computer model of each user moves in accordance with the motions of the user.

Japanese Patent Laid-Open Publication No. 2008-254103 discloses a robot that reproduces a presenter's actions. According to Japanese Patent Laid-Open Publication No. 2008-254103, an action of the presenter is analyzed, and from action patterns stored in a device, one that matches best with the action of the presenter is selected. Then, the robot is operated to perform the selected action pattern.

Japanese Patent Laid-Open Publication No. 2005-228353 (U.S. Patent Publication No. 2004/0027397A1) discloses that a graphic identifying section identifies a graphic drawn on a touch panel by a user from the locus of a touch panel pointer and that a graphic display section displays the identified graphic on a screen.

Japanese Patent Application No. 2006-164177 discloses an electronic conference system wherein a screen sharing software that permits the participants to obtain electronic data in real time and an application software that permits the participants to enter characters and graphics are concurrently used to conduct a conference.

In the meantime, in a teleconference, a participant may use body language and/or draw graphics in the air by fingers during his/her presentation. However, there are cases where the body language and/or the graphics cannot be delivered to other participants in other conference bases, depending on the size of the video picture. Also, some other participants in the same conference base may forget the graphics drawn in the air by the presenter and/or may have a misunderstanding of the graphics. It is possible to avoid such trouble by using an application software and/or an interactive board, which, however, requires some preparations, such as launching an application beforehand. Without such preparations, it is impossible to cope with a case of necessity, which may turn down the discussion.

SUMMARY OF THE INVENTION

An object of the present invention is to provide a teleconference system that makes an image showing the motion of a speaker's hand immediately and displays the image on display devices so that all the participants in the teleconference can share a common understanding, which makes the discussion more efficient.

A teleconference system for connecting a plurality of conference bases via a network, each of the conference bases comprising: a display device for displaying an image on a screen; a video camera that is capable of measuring a depth; a person identifying section for identifying a participant who has made a specified gesture as a speaker, from a video picture taken by the video camera; an image input/display control section that usually keeps the display device displaying predetermined conference material on the screen and that turns the screen blank triggered by the person identifying section's identifying a speaker; a motion identifying section for identifying and digitalizing a motion of the speaker's hand to make motion data; and an image generating section for making a line drawing in accordance with the motion data made by the motion identifying section; wherein the image input/display control section controls the display device to display the line drawing made by the image generating section on the screen.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

Figure 1:
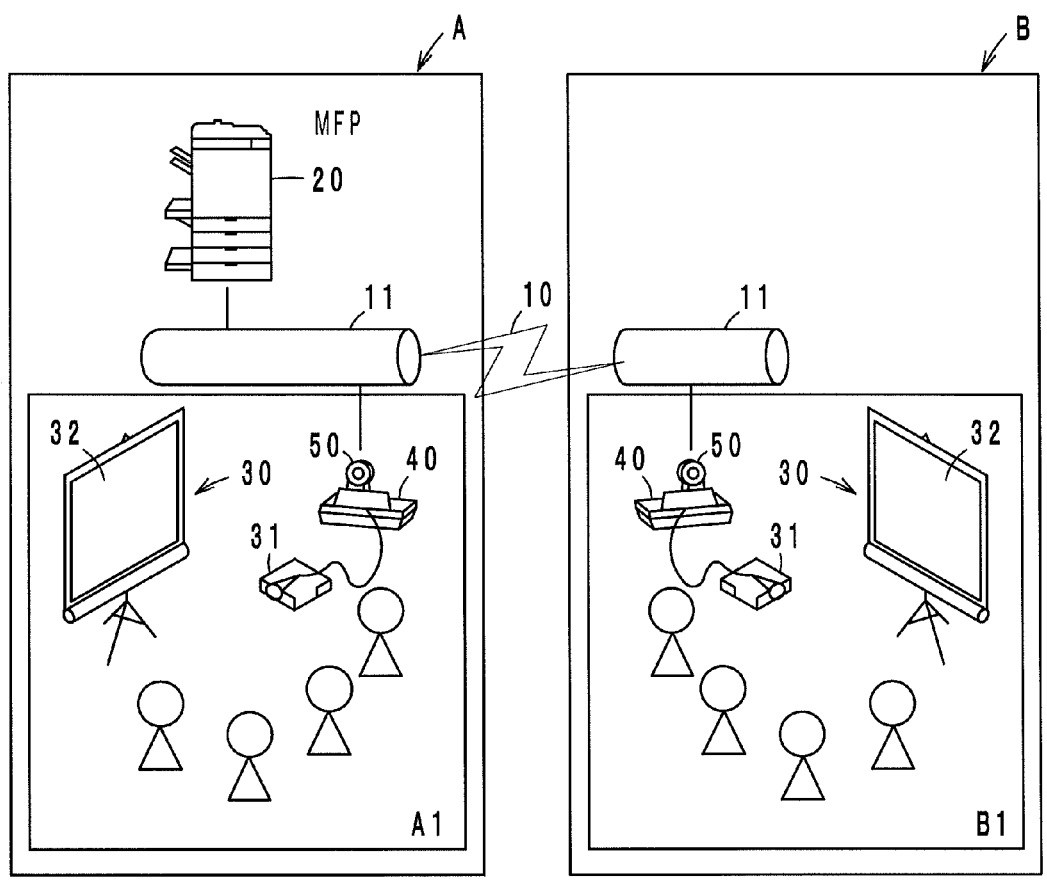
FIG. 1 is a configuration diagram of a teleconference system according to an embodiment of the present invention.

A teleconference system according to an embodiment of the present invention will be hereinafter described with reference to the accompanying drawings.

A teleconference system according to an embodiment of the present invention comprises a conference base A with a meeting room A1 and a conference base B with a meeting room B1 connected to each other via a network 10. A multifunction image data processer 20 is placed in the base A. A display device 30 and a teleconference terminal device 40 are placed in each of the bases A and B. The teleconference terminal devices 40 placed in the bases A and B are communicable with each other via LAN 11. Each display device 30 comprises a projector 31 and a screen 32. The projector 31 and a video camera 50 are connected to each of the teleconference terminal devices 40, and the video camera 50 is capable of measuring the depth. The multi-function image data processor will be hereinafter referred to as an MFP.

Figure 2:
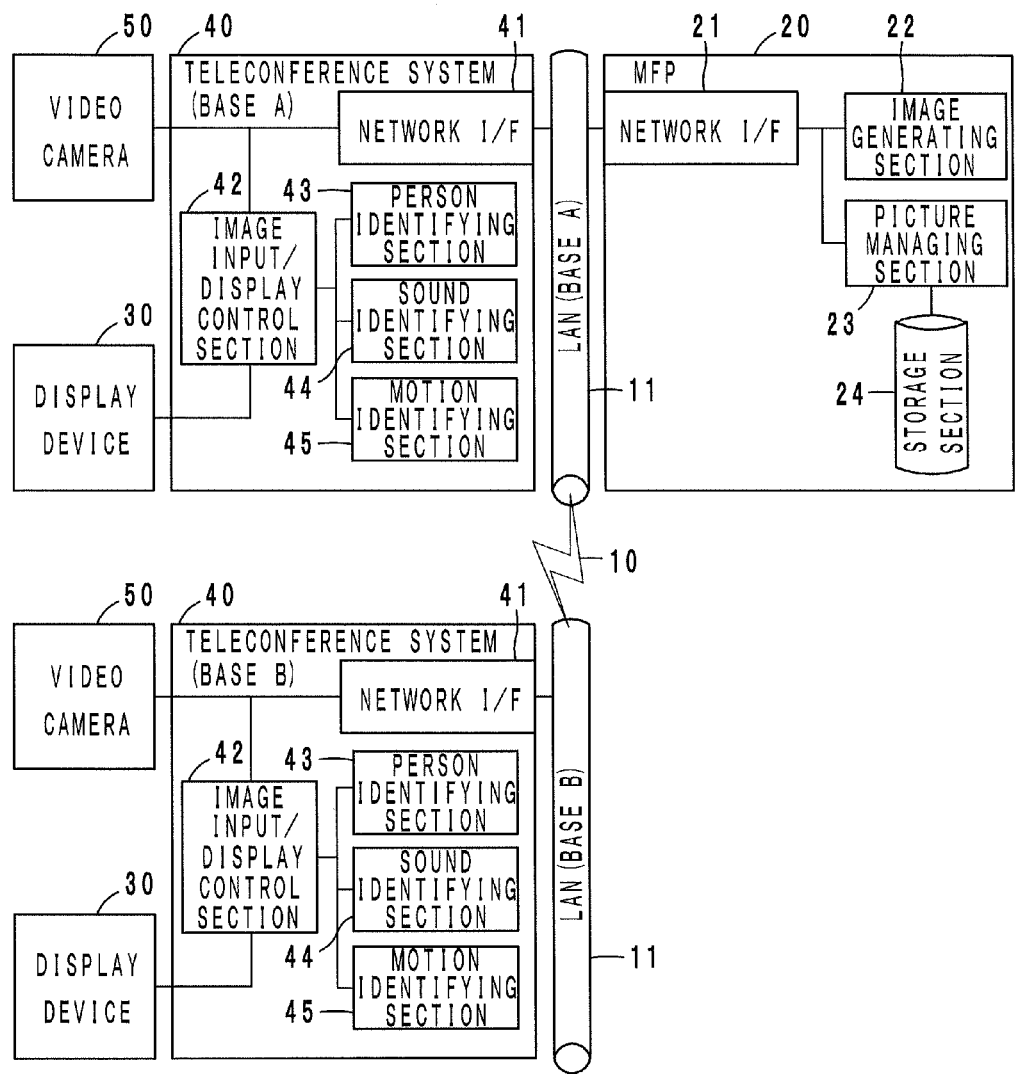
FIG. 2 is a block diagram showing configurations of conference bases.

The MFP 20 functions as an image reader that reads an image with a scanner and as an electrophotographic image forming apparatus. As shown in FIG. 2, the MFP 20 comprises a network interface 21 connected to the LAN 11, an image generating section 22, a picture managing section 23 and a storage section 24.

Each of the teleconference terminal devices 40, as shown in FIG. 2, comprises a network interface 41, an image input/display control section 42, a person identifying section 43, a sound identifying section 44 and a motion identifying section 45.

The person identifying section 43 picks up a person who has made a specified gesture from participants in the conference, from the video picture taken by the video camera 50, and identifies the person as a speaker. The specified gesture is preferably an unusual action, for example, an action of raising a hand with the fingers closed. The participants receive an explanation of such a specified gesture beforehand.

The image input/display control sections 42 in the bases A and B usually keep the display devices 30 displaying predetermined conference material on the screens 32. The fact that the person identifying section 43 in either of the bases A or B has identified a speaker triggers a change in the images displayed on the screens 32. Specifically, at this time, the image input/display control sections 42 in the bases A and B control the display devices 30 such that the screens 32 are turned blank. In the base A or B where the speaker is present, the sound identifying section 44 collects the speaker's voice as audio data via a microphone (not shown) and delivers the audio data to the meeting rooms A1 and B1. The video camera 50 tracks the speaker's hand, and from the video picture taken by the video camera 50, the motion identifying section 45 identifies and digitalizes the motion of the speaker's hand to make motion data. In order to facilitate the identification of a significant motion of the speaker's hand, preferably, it is predetermined that a raised finger would be identified and tracked. The participants in the conference receive an explanation of such a motion beforehand. The motion identifying section 45 links the motion data with the audio data, and the image generating section 22 makes a combination image representing the motion data and the audio data.

From the motion data generated by the motion identifying section 45, the image generating section 22 makes a line drawing. Further, the image generating section 22 may replace the line drawing with one of predetermined shapes, such as a polygon, a circle and an ellipse, that is similar to the line drawing.

The image input/display control sections 42 in the bases A and B control the display devices 30 to display the image made by the image generating section 22 and a picture of the speaker on the screens 32. Specifically, the image input/display control section 42 in the base where the speaker is present produces a picture of the speaker by picking up the speaker and the vicinity from the video picture taken by the video camera 50, and the picture of the speaker is displayed at corners of the respective screens 32 to be superimposed on the image made by the image generating section 22.

Thereafter, the image input/display control sections 42 in the bases A and B controls the display devices 30 to stop displaying the image associated with the speaker's statement on the screens 32, triggered by a specified gesture made by the speaker. The specified gesture in this moment is preferably an action of dropping a hand down. For a specified period after the speaker drops his/her hand down, the image input/display control sections 42 still keeps the display devices 30 displaying the image associated with the speaker's statement on the screens 32, and thereafter, the image input/display control sections 42 turn the screens 32 back to normal. It is effective for helping the participants keep a visual image to continue displaying the image associated with the speaker's statement for a while after the speaker completes making a statement.

Figure 3:
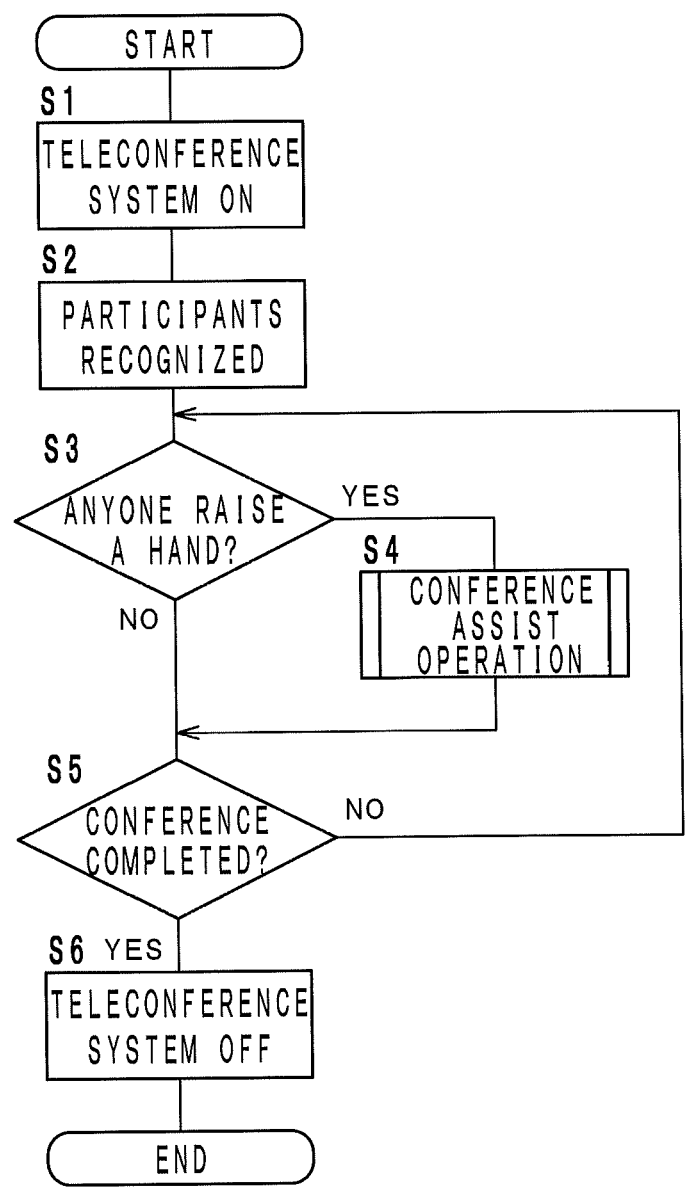
FIG. 3 is a flowchart showing a general procedure of a teleconference by use of the teleconference system.

Now, the general procedure of a teleconference by use of the above-described teleconference system is described with reference to the flowchart of FIG. 3. First, the teleconference terminal devices 40 placed in the conference bases A and B are connected to each other, whereby the teleconference system is turned on (step S1). In this moment, the video cameras 50 in the bases A and B start shooting. Based on the video pictures taken by the video cameras 50, the image input/display control sections 42 discriminate the participants from one another, and the picture managing section 23 manages the pictures of the participants individually (step S2). The image input/display control sections 42 can control the display devices 30 so as to display the individual participants' photos managed by the picture managing section 23 and stored in the storage 24 on the screens 32.

Usually, predetermined conference material is displayed on the screens 32. When either of the person identifying sections 43 in the bases A and B recognizes that a participant has made the predetermined gesture (an action of raising a hand with the fingers closed) (YES at step S3), a conference assist operation is started (step S4). When the teleconference is completed, (YES at step S5), the teleconference terminal devices 40 are disconnected from each other (step S6).

Figure 4:
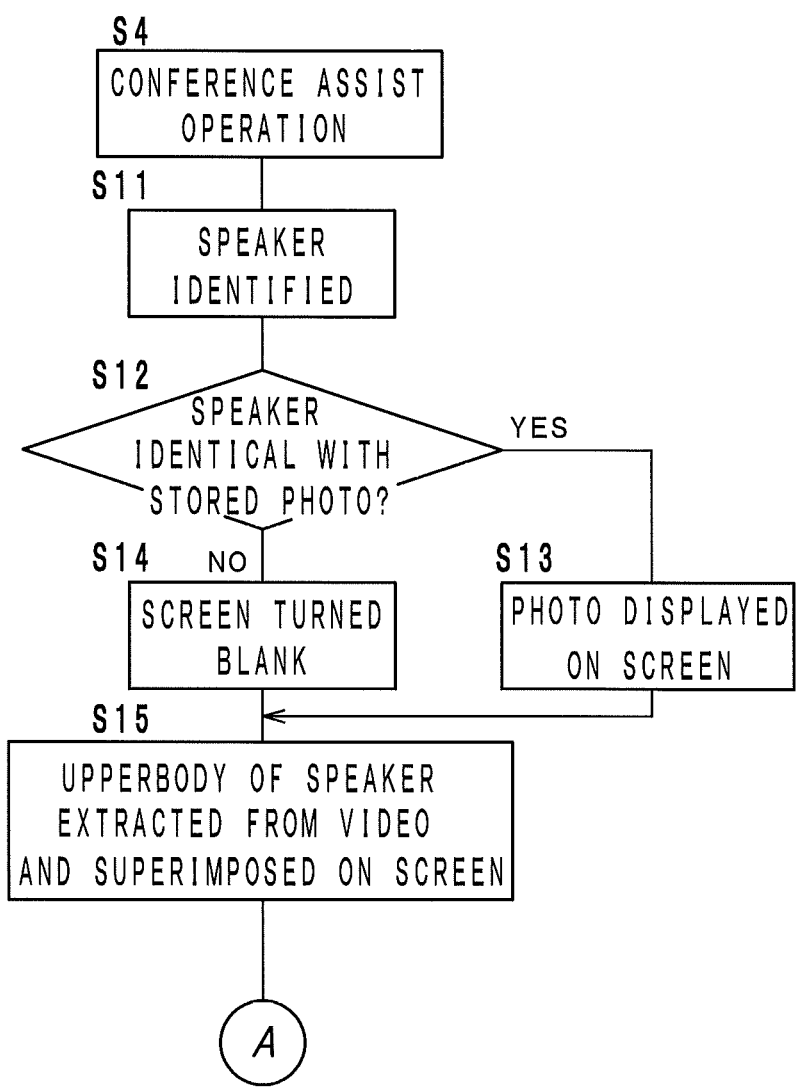
FIGS. 4 and 5 are flowcharts showing a conference assist operation.
Figure 5:
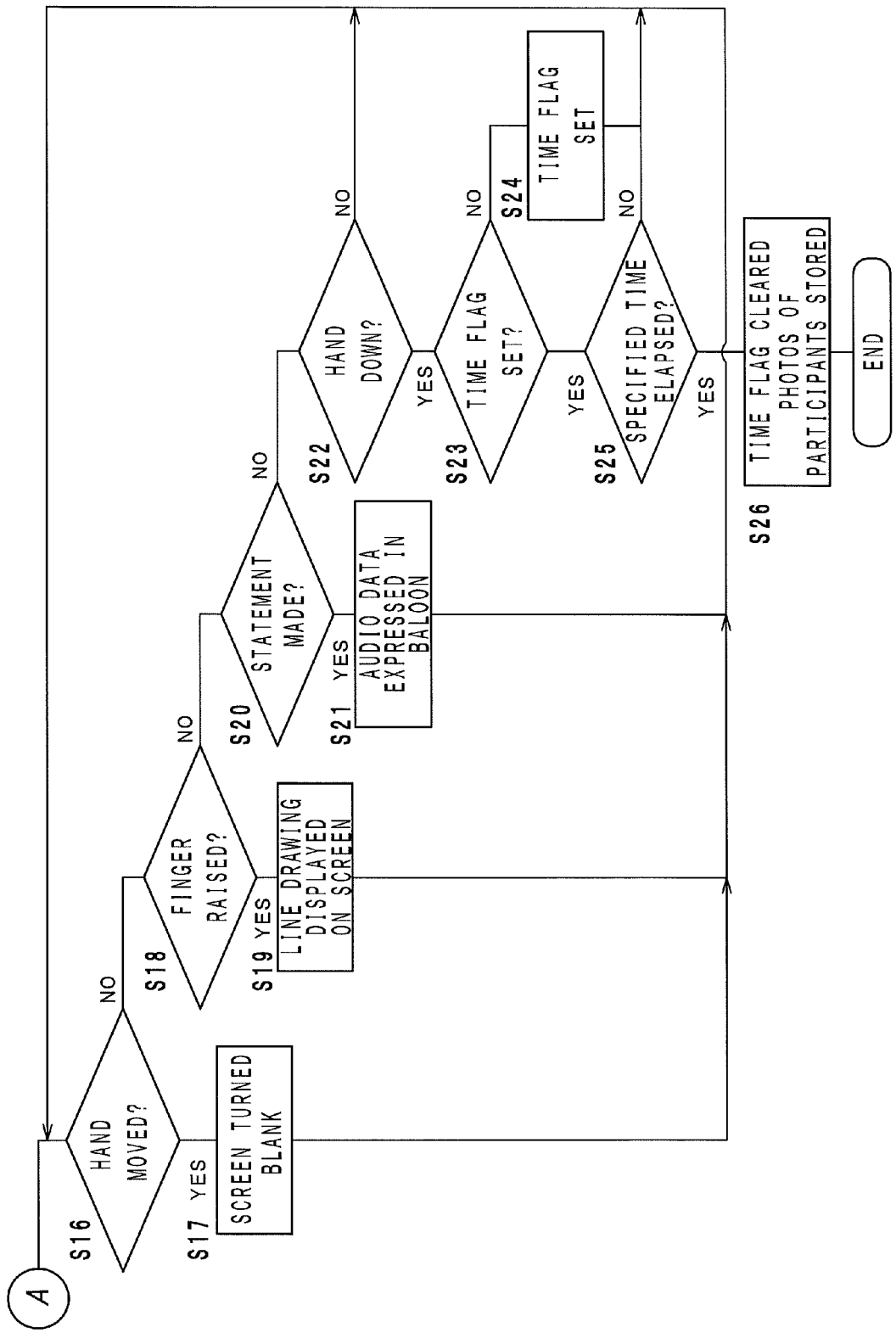

The conference assist operation carried out at step S4 is described with reference to the flowcharts of FIGS. 4 and 5. When a person present in either the base A or B raises his/her hand during the progress of conference, the person identifying section 43 in the base A or B identifies the person as a speaker (step S11), and it is determined whether the specified person is identical with one of the photos stored in the storage 24 (step S12). When the person is identical with one of the stored photos, the photo is displayed on the screens 32 (step S13). If there are no photos identical with the person in the storage 24, the screens 32 are turned blank (step S14).

Figure 6A:
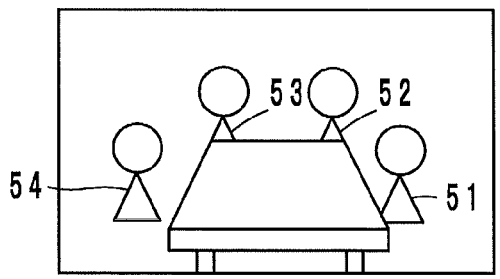
FIG. 6 is an illustration of the conference assist operation.
Figure 6B:
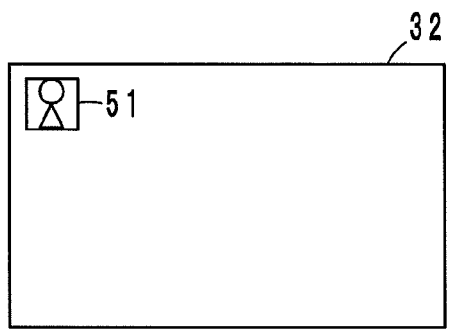

Next, the upper body of the person identified as a speaker (the person who raised a hand) is extracted from the video picture taken by the video camera 50 and is displayed at corners of the respective screens 32 to be superimposed on the blank picture or the photo of the person (step S15). For example, there are four participants 51 to 54 as, shown in FIG. 6a, and when the participant 51 raises a hand, the upper body of the participant 51 is displayed at corners of the screens 32 (see FIG. 6b).

Figure 6C:
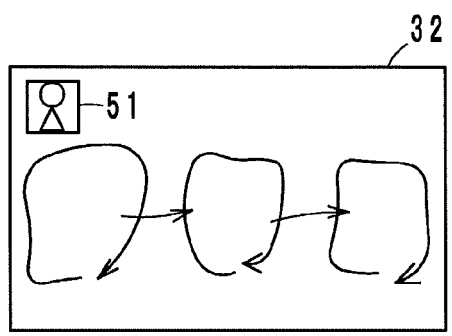

When the speaker moves his/her hand right and left widely (YES at step S16), the screens 32 are turned blank (step S17), and the processing returns to step S16. When the speaker moves his/her hand with a finger raised (YES at step S18), a line drawing showing the motion of the finger is displayed on the blank pictures of the screens 32 (step S19), and thereafter, the processing returns to step S16. FIG. 6c shows the state of the screens 32 in this moment.

Figure 7:
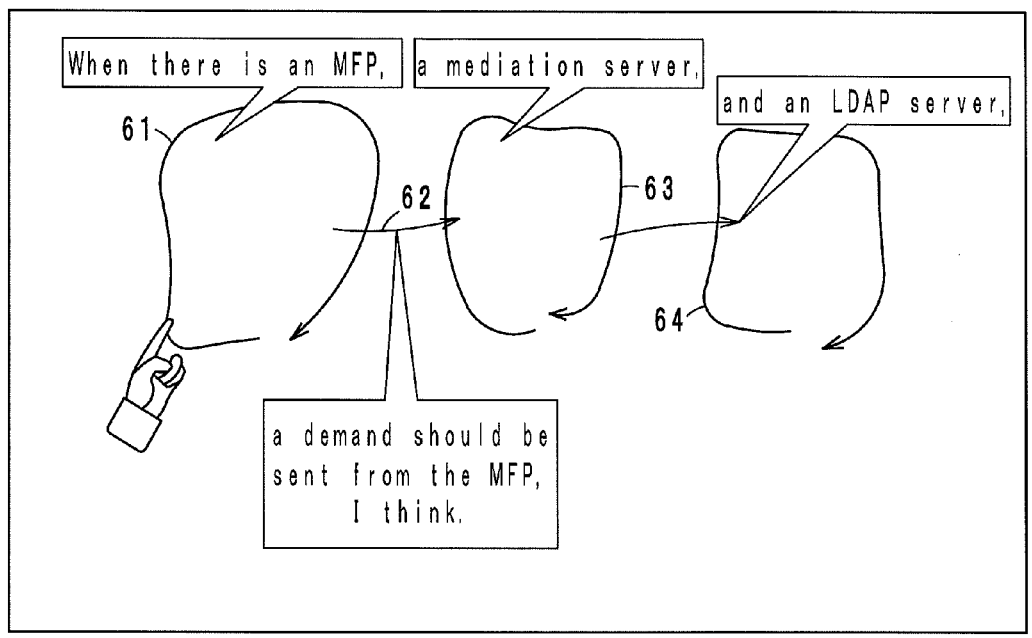
FIG. 7 is an example of a picture displayed on a display device.

When the speaker makes a statement (YES at step S20), the content of the statement is recognized and is shown by characters in a balloon attached to the line drawing. Thereafter, the processing returns to step S16. FIG. 7 shows an example of displaying the content of the statement and the motion of the speaker's hand. FIG. 7 shows that the speaker said, "when there is an MFP," while moving his/her hand in the way shown by the line drawing 61, "a mediation server," while moving his/her hand in the way shown by the line drawing 63, "and an LDAP server," while moving his/her hand in the way shown by the line drawing 64, and "a demand should be sent from the MFP, I think." while moving his/her hand in the way shown by the line drawing 62.

When the speaker drops his/her hand down (YES at step S22), it is checked whether a time flag is set (step S23). If the time flag has not been set, the time flag is set (step S24), and the processing returns to step S16. If the time flag has already been set, and if a specified time has passed (YES at step S25), the time flag is cleared, and the photos of the participants are stored in the storage 24 (step S26). Then, the conference assist operation is completed.

Figure 6D:
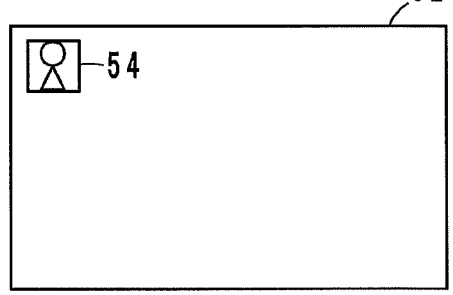
Figure 6E:
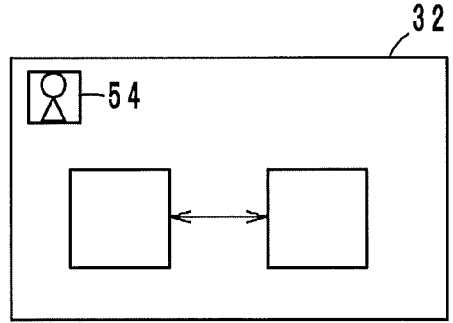

Thereafter, when the participant 54 raises a hand, in the same way as described above, the picture of the participant 54 is displayed at corners of the screens 32 (see FIG. 6d). A line drawing obtained from motion data representing the motion of the participant's 54 hand with a finger raised may be replaced with one of predetermined shapes, such as a polygon, a circle and an ellipse, that is similar to the line drawing, and the replaced polygon, circle, ellipse or the like may be displayed on the screens 32 (see FIG. 6e).

Thus, in the teleconference system according to this embodiment, an image showing the motion of a speaker's hand is made immediately and displayed on the display devices placed in the conference bases, so that all the participants in the teleconference can share a common understanding, which makes the discussion more efficient.

OTHER EMBODIMENTS

The MFP 20 is not indispensable for the teleconference system, as long as the image generating section 22, the picture managing section 23 and the storage section 24 are incorporated in the teleconference terminal devices 40. On the contrary, some functions of the teleconference terminal devices 40 may be transferred to the MFP 20, and in this case, the MFP 20 must be installed in every conference base. The display device 30 is not necessarily composed of a projector and a screen, and may be a liquid crystal display device.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A teleconference system for connecting a plurality of conference bases via a network, each of the conference bases comprising:
    a display device for displaying an image on a screen;
    a video camera that is capable of measuring a depth;
    a person identifying section for identifying a participant who has made a specified gesture as a speaker, from a video picture taken by the video camera;
    an image input/display control section that usually keeps the display device displaying predetermined conference material on the screen and that turns the screen blank triggered by the person identifying section's identifying a speaker;
    a motion identifying section for identifying and digitalizing a motion of the speaker's hand to make motion data; and
    an image generating section for making a line drawing in accordance with the motion data made by the motion identifying section;
    wherein the image input/display control section controls the display device to display the line drawing made by the image generating section on the screen.

2. A teleconference system according to claim 1, wherein the specified gesture is an action of raising a hand with the fingers closed.

3. A teleconference system according to claim 1, wherein the motion identifying section identifies a motion of a hand with a finger raised.

4. A teleconference system according to claim 1,
    wherein each of the conference bases further comprises an audio identifying section for identifying a statement made by the speaker to make audio data,
    wherein the image generating section makes an image wherein the audio data is expressed in a position linked with the line drawing showing the motion data.

5. A teleconference system according to claim 1, wherein the image input/display control section discriminates participants in a teleconference and manages pictures of the participants individually.

6. A telecommunication system according to claim 5, wherein the image input/display control section controls the display device so as to display the pictures of the participants on the screen individually.

7. A telecommunication system according to claim 1, wherein the image input/display control section makes a picture of the speaker identified by the person identifying section by extracting the speaker and the vicinity from a video picture taken by the video camera, and controls the display device to display the picture of the speaker at a corner of the screen to be superimposed on the image generated by the image generating section.

8. A teleconference system according to claim 1, further comprising a multi-function image data processer that is connected to the bases via the network,
    wherein the image generating section is incorporated in the multi-function image data processer.

9. A teleconference system according to claim 1, wherein the image generating section further replaces the line drawing obtained from the motion data with one of predetermined shapes, at least including a polygon, a circle and an ellipse, that is similar to the line drawing.

10. A teleconference system according to claim 1, wherein the image input/display control section controls the display device to stop displaying the line drawing made by the image generating section in accordance with the motion of the speaker's hand, triggered by the motion identifying section's identifying a predetermined gesture made by the speaker.

11. A telecommunication system according to claim 10, wherein the predetermined gesture is an action of dropping a hand down.

12. A teleconference system according to claim 10, wherein the image input/display control section controls the display devices to continue displaying the line drawing made by the image generating section for a specified period after the motion identifying section identifies the predetermined gesture made by the speaker, and controls the display device to display the predetermined conference material again when the specified period elapses.

* * * * *